(12) United States Patent
Konz et al.

(10) Patent No.: US 11,960,108 B2
(45) Date of Patent: Apr. 16, 2024

(54) PASSIVE ILLUMINATION DEVICE

(71) Applicant: IOSS intelligente optische Sensoren & Systeme GmbH, Radolfzell (DE)

(72) Inventors: Christian Konz, Oehningen-Wangen (DE); Joachim Gaessler, Donaueschingen (DE); Harald Richter, Radolfzell (DE)

(73) Assignee: IOSS intelligente optische Sensoren & Systeme GmbH, Radolfzell (DE)

( * ) Notice: Subject to any disclaimer, the term of this patent is extended or adjusted under 35 U.S.C. 154(b) by 0 days.

(21) Appl. No.: 17/627,611

(22) PCT Filed: Jul. 10, 2020

(86) PCT No.: PCT/EP2020/069590
§ 371 (c)(1),
(2) Date: Jan. 14, 2022

(87) PCT Pub. No.: WO2021/009059
PCT Pub. Date: Jan. 21, 2021

(65) Prior Publication Data
US 2022/0276415 A1 Sep. 1, 2022

(30) Foreign Application Priority Data
Jul. 18, 2019 (DE) ...................... 10 2019 119 501.2

(51) Int. Cl.
*G02B 5/02* (2006.01)
*G02B 27/10* (2006.01)
(Continued)

(52) U.S. Cl.
CPC ........... *G02B 5/0273* (2013.01); *G02B 27/10* (2013.01); *G06K 7/10831* (2013.01); *G06K 7/1404* (2013.01)

(58) Field of Classification Search
CPC .................................................... G02B 5/0273
(Continued)

(56) References Cited

U.S. PATENT DOCUMENTS

| 5,335,158 A | 8/1994 | Kaplan et al. |
| 6,595,422 B1 | 7/2003 | Doljack |

(Continued)

FOREIGN PATENT DOCUMENTS

| DE | 112006002867 T5 | 10/2008 |
| DE | 102007043609 A1 | 3/2009 |

(Continued)

OTHER PUBLICATIONS

German Search Report dated Mar. 3, 2020, issued in corresponding German Patent Application No. DE 10 2019 119 501.2 (and partial English translation).

(Continued)

*Primary Examiner* — Rafferty D Kelly
(74) *Attorney, Agent, or Firm* — POSZ LAW GROUP, PLC

(57) ABSTRACT

A passive illumination device for use with at least one light source unit of an image receiver, in particular of a code reading device and/or code verification device, has at least one diffuser unit which is configured for converting light provided by the light source unit into at least substantially diffuse illumination light for an illumination of at least one illumination region and which comprises at least one diffuser element with at least one diffusion shell for a scattering of the light.

17 Claims, 5 Drawing Sheets

Figure 1:
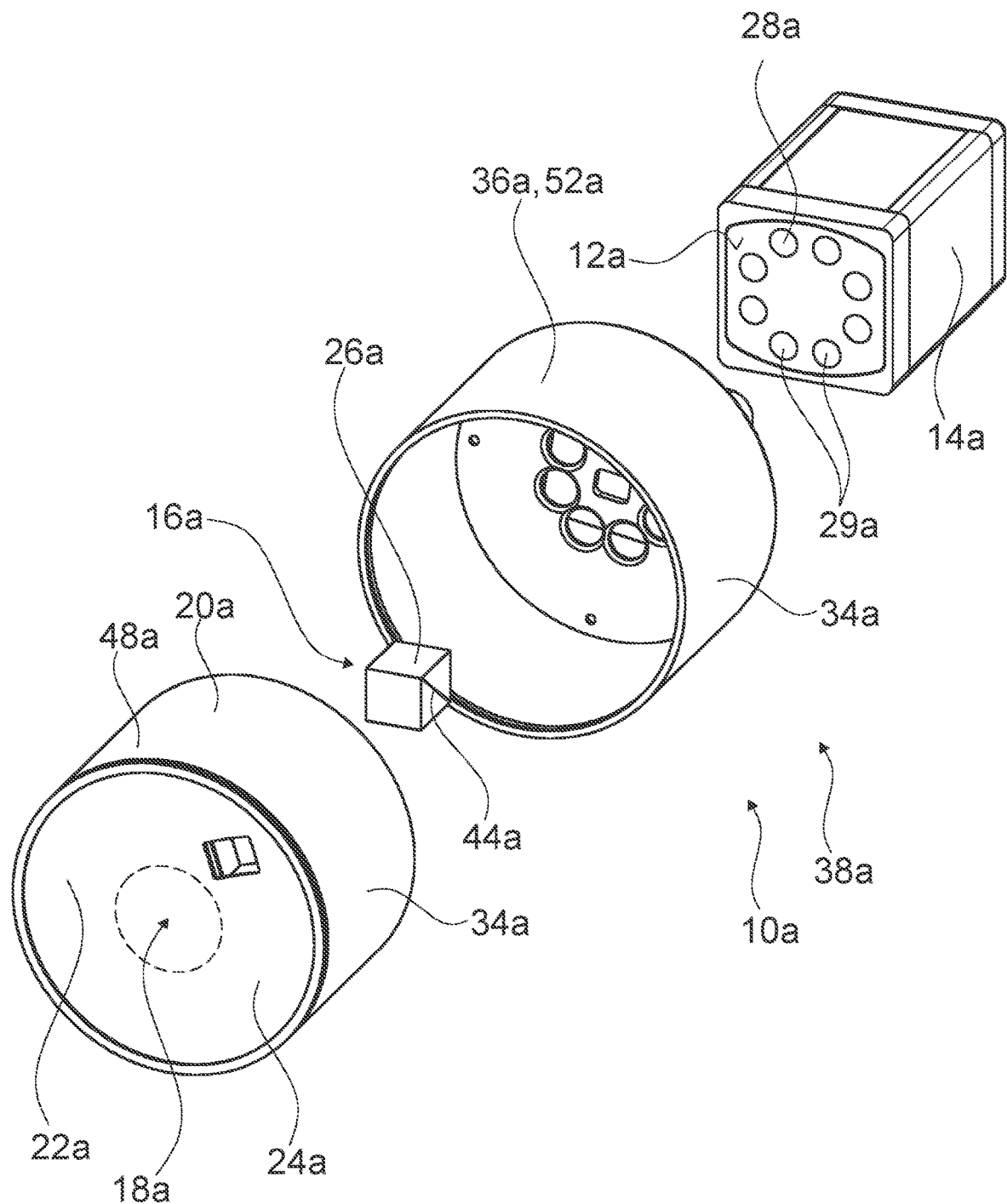

(51) Int. Cl.
*G06K 7/10* (2006.01)
*G06K 7/14* (2006.01)

(58) Field of Classification Search
USPC .......................................................... 235/454
See application file for complete search history.

(56) References Cited

U.S. PATENT DOCUMENTS

| 9,292,724 | B1* | 3/2016 | Flügge | G06K 7/10742 |
|---|---|---|---|---|
| 2007/0090193 | A1 | 4/2007 | Nunnink et al. | |
| 2008/0142600 | A1* | 6/2008 | Joseph | G06K 7/10732 |
| | | | | 235/462.42 |
| 2011/0080729 | A1 | 4/2011 | Nunnink et al. | |
| 2012/0080699 | A1 | 4/2012 | Chowdhury et al. | |

FOREIGN PATENT DOCUMENTS

| DE | 102017118246 A1 | 2/2019 |
|---|---|---|
| EP | 2592328 A1 | 5/2013 |
| WO | 2006065619 A1 | 6/2006 |

OTHER PUBLICATIONS

English machine translation of International Search Report dated Feb. 9, 2021, issued in corresponding International Patent Application No. PCT/EP2020/069590.

English machine translation of International Preliminary Report on Patentability dated Jan. 18, 2022, issued in corresponding International Patent Application No. PCT/EP2020/069590.

Office Action dated Sep. 4, 2023 issued in corresponding European Patent Application No. 20840004.4 (and English machine translation).

* cited by examiner

PASSIVE ILLUMINATION DEVICE

CROSS REFERENCE TO RELATED APPLICATIONS

This application is a U.S. national stage application of PCT/EP2020/069590 filed on Jul. 10, 2020, which is based on German Patent Application No. 10 2019 119 501.2 filed on Jul. 18, 2019, the contents of which are incorporated herein by reference.

PRIOR ART

The invention concerns a passive illumination device according to claim 1 and a system with the passive illumination device and with an image receiver, in particular a code reading device and/or code verification device, according to claim 14.

It has already been proposed to provide diffuse illumination for code reading devices by active illumination devices having their own light sources.

The objective of the invention is in particular to provide a generic device having improved characteristics regarding construction. The objective is achieved according to the invention by the features of patent claims 1 and 14 while advantageous implementations and further developments of the invention may be gathered from the subclaims.

ADVANTAGES OF THE INVENTION

A passive illumination device is proposed for use with at least one light source unit of an image receiver, in particular of a code reading device and/or code verification device, with at least one diffuser unit which is configured for converting light provided by the light source unit into at least substantially diffuse illumination light for an illumination of at least one illumination region, and which comprises at least one diffuser element with at least one diffusion shell for a scattering of the light.

This in particular allows simplifying construction. Advantageously active units, like for example light sources, may be dispensed with. Especially advantageously simple mounting and/or demounting of the passive illumination device at the image receiver is enabled for the purpose of changing between direct illumination and diffuse illumination.

By an "illumination device" is in particular a unit to be understood which is configured to provide a pre-defined illumination of the illumination region, in particular using the light provided by the external light source unit. In particular, for providing the illumination, the passive illumination device may comprise any kind of passive optical units known to someone skilled in the art, like for example mirrors, diffusers, filters and/or fiber optics. By the illumination device being "passive" is in particular to be understood that the illumination device is free of active units, like for example light sources of its own and/or switchable optical units. Advantageously the passive illumination device can be used without an energy source of its own. Preferably the passive illumination device is configured together with the image receiver to realize a structural unit, in particular a system, in particular a code reading and/or code verification system.

Advantageously the passive illumination device comprises at least one light receiving region, which is in particular configured to receive the light provided by the light source unit and preferably to let said light pass in an obstruction-free manner. Especially advantageously the passive illumination device comprises at least one light processing region, which is in particular configured to process the light provided by the light source unit and to provide the diffuse illumination light. In particular, the diffusion shell is arranged within the light processing region. Preferably, viewed from the illumination region, the light processing region is arranged in front of the light receiving region.

Advantageously the passive illumination device is removable from the image receiver. The passive illumination device may, for example, be fastened removably on the image receiver via a snap connection and/or via a screw connection. Preferentially the passive illumination device can be plugged onto the image receiver.

By an "image receiver" is in particular an apparatus to be understood which is configured to receive, and advantageously to evaluate, an image of the illumination region. It would be conceivable that the image receiver comprises a camera and/or an optical measurement device and/or a controlling device. It may be possible that the image receiver is configured to provide images of objects within the illumination region for a determination of identification characteristics and/or measurement values, and/or images of objects for executing controlling functions, for example a completeness check. If the image receiver is embodied as a code reading device and/or code verification device, the image receiver is advantageously configured to read and/or verify at least one code that is arranged in the illumination region.

"Light provided by the light source unit" is in particular to mean, in this context, light which is produced by the light source unit in at least one operation state, which enters through the light receiving region of the passive illumination device and which preferably has not yet arrived in the illumination region, in particular in the light processing region. "Diffuse illumination light" is in particular to mean, in this context, light which exits from the light processing region toward the illumination region and has preferably not yet arrived in the illumination region.

By a "diffuser unit" is in particular a unit to be understood which is configured to convert light, preferably direct light, passing the diffuser unit into diffuse scattered light, preferentially into the diffuse illumination light. Advantageously the diffuser unit, preferably the diffuser element and particularly preferentially the diffusion shell, at least comprises a translucent material and is advantageously made of such a translucent material. By a "translucent material" is in particular a material to be understood which has a measure of dispersion that is at least 50%, advantageously at least 70% and especially advantageously at least 90%. A "measure of dispersion" of a body is in particular be understood as a ratio of a scattered-light intensity, i. e. in particular an intensity of the scattered light, on an exit side of the body to an entry-light intensity on an entry side of the body. In particular, a theoretical perfectly transparent material has a measure of dispersion that is zero. Translucent materials may in particular also be denominated "ground-glass like". It would be conceivable that the diffuser unit comprises further, opaque materials.

By a "diffusion shell" is in particular a portion of the diffuser element to be understood which at least comprises a translucent material and which may in particular be implemented completely of the translucent material. In particular, when viewed from the illumination region, at least the diffusion shell has an, in particular regular, concave shaping. In particular, the diffusion shell defines a solid-angle zone from which the diffuse illumination light hits the illumination region. Preferably the solid-angle region is at least substantially $2\pi$. Preferentially the solid-angle region differs from $2\pi$ by maximally 20%, advantageously by maximally 15% and particularly advantageously by maximally 10%. In particular, the diffusion shell comprises at least one pass-through, which is configured to allow a passage of light coming from the illumination region, in particular light reflected on at least one object that is arranged in the illumination region, for the purpose of providing the image. In particular, the light reflected by the object differs from the light provided by the light source unit and from the diffuse illumination light. It would be conceivable that the pass-through at least comprises a transparent or a semi-permeable material. Preferably the pass-through is embodied as a recess of the diffusion shell.

"Configured" is in particular to mean specifically programmed, designed and/or equipped. By an object being configured for a certain function is in particular to be understood that the object fulfills and/or executes said certain function in at least one application state and/or operation state. In particular, "configured" does not mean mere suitability.

It is furthermore proposed that the diffusion shell comprises at least one inner surface, which is implemented as a partial surface of an imaginary ovoid, in particular of an imaginary sphere. By a "partial surface" of the ovoid is in particular, in this context, a portion of a superficies of the ovoid to be understood, which is at least substantially shell-shaped. Preferably the ovoid has at least one symmetry axis, which advantageously extends through the pass-through and in particular through a geometric center of the pass-through. This in particular allows increasing a solid-angle region of the diffuse illumination light in a construction-wise simple manner.

In an alternative implementation it is proposed that the diffusion shell comprises at least one inner surface that is implemented as a partial surface of an imaginary cylinder. By a "partial surface" of the cylinder is in particular, in this context, a portion of an envelope surface of the cylinder to be understood which, viewed along a longitudinal axis of the cylinder, has an at least substantially shell-shaped cross section. Advantageously the longitudinal axis of the cylinder runs parallel to the pass-through, in particular to a main extension direction of the pass-through. This allows introducing regions, which are arranged on a longitudinal object and are to be imaged, into the illumination region in a simple manner, via an alignment of a longitudinal axis of the object parallel to the longitudinal axis of the cylinder.

In a further alternative implementation, it is proposed that the diffusion shell comprises at least one inner surface that is implemented as a partial surface of an imaginary conus, in particular of a perpendicular conus. By a "partial surface" of the conus is in particular, in this context, an at least substantially shell-shaped portion of an envelope surface of the conus to be understood, advantageously the entire envelope surface of a truncated conus derived from the conus. This in particular allows increasing a solid-angle region of the diffuse illumination light in a construction-wise simple manner.

It would be conceivable that the diffuser element realizes the diffuser unit completely. In order to obtain an adaptable implementation of the diffuser unit, it is proposed that the diffuser unit comprises at least one optical element, which is configured to deflect light provided by at least one light source of the light source unit and/or scattered light generated from this light toward the illumination region, preferably as a diffuse illumination light. By the optical element being configured to "deflect" light is in particular to be understood that the optical element changes via at least one reflection a course direction of light passing through the optical element. For example, the optical element may be embodied as a mirror or as a fiber optic. Advantageously the implementation of the diffuser unit is adaptable to different arrangements and/or orientations of the light source unit of the image receiver.

It would be possible that the optical element is configured to reflect all the light incident in the optical element. In order to improve an image quality of the illumination region in a construction-wise simple manner, it is proposed that the optical element is configured to let light reflected by the illumination region pass at least partially, in particular at least by an intensity fraction of 50%, in particular free of scattering processes and/or reflections. In particular, the optical element contributes in a generation of a beam path that runs from the light source of the image receiver via a deflection at the optical element to the illumination region and via a reflection at the illumination region and passing of the optical element to a detector unit of the image receiver. Preferentially, viewed from the illumination region, the optical element is arranged behind the pass-through of the diffusion shell. Particularly preferentially the optical element comprises at least one absorption element, which is configured for an absorption of a light fraction that was allowed to pass to the illumination region in the deflection of the light provided by the light source of the light source unit and/or of the diffuse illumination light, for the purpose of avoiding undesired light, in particular stray light, having an influence on the detector unit. Advantageously the absorption element is implemented as a coating. Alternatively, the absorption element could also be implemented as a, preferably plate-shaped, element that is different from a coating. It would also be conceivable that the absorption element is implemented separately from the optical element. Preferably the absorption element has a refractive index that is identical to a refractive index of the remaining optical element, so as to avoid a reflection of the light fraction that was allowed to pass on the absorption element. It is advantageously possible to achieve an illumination of the illumination region starting from the pass-through of the diffusion shell, thus obtaining a gap-free solid-angle region of the diffuse illumination light.

It is also proposed that the optical element comprises at least one semi-permeable mirror. This in particular allows reducing a construction space of the optical element and simplifying a construction of the optical element. Advantageously, deflecting of light and allowing passage of light may together be provided by a subregion of the optical element. It would be conceivable that the optical element is implemented completely as a semi-permeable mirror. Alternatively the optical element may have a mirroring region and a transparent region that is spaced apart from the mirroring region.

Preferentially the optical element is embodied as a beamsplitter cube and the diffuser element comprises at least one receptacle for a form-fit holding of the optical element. By a "beamsplitter cube" is in particular a cuboid element to be understood which comprises at least one semi-permeable mirror forming, for example, a side surface of the element, preferentially a diagonal surface of the element. Advantageously the absorption element implements a coating of a side surface of the optical element. For example, the receptacle may have at least one protruding rim and/or at least one frame and/or at least one deepening that is implemented as a negative of the object. This in particular allows simplifying a mounting of the optical element in a construction-wise simple manner. Advantageously the optical element can be fastened to the diffuser element by a simple plugging process. Alternatively, the optical element could be fastened to the diffuser element by at least one snap connection and/or screw connection and/or adhesive connection.

Beyond this it is proposed that the diffuser unit and in particular the diffuser element comprise/s at least one subregion that is configured to feed light provided by the light source into the optical element. In particular, the subregion may be implemented as a further optical element of the diffuser unit, and in particular separately from the diffuser element. In particular, the further optical element may be implemented identically to the optical element. By the subregion "feeding" light into an element is in particular to be understood, in this context, that at least by reflection and/or transmission and/or scattering, the subregion contributes in such a way that the light provided by a light source enters the element. Advantageously the diffuser unit comprises at least one further subregion, which comprises a translucent material and is arranged between the subregion and the optical element. This in particular allows improving an imaging quality of the image in a construction-wise simple manner. Advantageously, an arrangement of the optical element behind the pass-through, permits dispensing with additional light sources for feeding light into the optical element.

It may be possible that the subregion feeds all the light provided by the light source into the optical element. For further increasing an imaging quality of the image, it is proposed that the subregion is additionally configured to feed light provided by the light source into the diffusion shell. The subregion in particular has a surface allowing a passage of a light fraction of the light provided by the light source, in particular diffusely scattering the light fraction of the light provided by the light source, and reflecting a further light fraction of the light provided by the light source. Alternatively or additionally, the surface may comprise at least one recess through which the light provided by the light source can be fed into the diffusion shell. In particular, a number and/or a size of recesses of the surface could be adapted in order to obtain a desired transmittance of the surface. Preferably the diffuser unit comprises at least one filter element, which is configured to adapt the light provided by the light source of the light source unit for a homogenization of the diffuse illumination light. Advantageously the filter element reduces and/or scatters a light intensity of a light fraction of the light provided by the light source of the light source unit which does not enter the subregion, such that after the filter unit the light intensity of the light fraction is identical to a light intensity of the light fraction reflected at the subregion and a homogeneous light intensity of the diffuse illumination light is ensured. The filter element is preferably implemented so as to be plate-shaped and/or film-like. For example, the filter element may be embodied as a ring foil. Advantageously a gap-free solid-angle region of the diffuse illumination light is achievable.

It would be conceivable that, for example, the diffusion shell is fastened to the remaining diffuser element via at least one snap connection and/or plug connection and/or adhesive connection and/or screw connection. For a simplification of a construction of the diffuser element, it is proposed that the diffuser element is embodied in one piece, in particular in a one-part implementation. "In one piece" is in particular to mean at least connected by substance-to-substance bond, for example via a welding process, a gluing process, an injection-molding process, and/or a different process that is deemed to be expedient by someone skilled in the art. "In a one-part implementation" is in particular to mean formed in one piece. Preferably said one piece is produced from a single blank, from a mass and/or from a cast, for example in an injection-molding procedure, in particular a one-component and/or multi-component injection-molding procedure. Particularly preferentially the diffuser element is produced by an additive production procedure, preferably by a 3D printing procedure. This allows reducing a number of components. It is advantageously possible to reduce a number of method steps for the production of the diffuser element. Especially advantageously it is possible to adapt an implementation of the diffuser element in a simple manner, without requiring extensive changes in the production process.

It is further proposed that the diffuser unit comprises an outer wall encompassing the diffusion shell completely. In particular, the outer wall comprises at least an opaque material. It would be conceivable that the outer wall is implemented completely of the opaque material. It would be further conceivable that the outer wall is implemented completely of an envelope of the diffuser element. Preferably the outer wall comprises at least one envelope of the diffuser element and at least one, preferably opaque, attachment. The attachment may in particular be configured for coupling the diffuser element to the image receiver. In particular, the attachment comprises a receptacle for a form-fit holding of the image receiver. The attachment could, for example, be fastened to the image receiver via at least one snap connection and/or screw connection. Preferentially the attachment can be plugged onto the image receiver. In particular, the diffuser element may be fastened to the attachment by at least one snap connection and/or plug connection, preferably by at least one screw connection. This in particular allows improving an illumination of the illumination region in a construction-wise simple manner. By the outer wall it is advantageously possible to delimit a spreading of the light provided by the light source unit. Especially advantageously an entrance of ambient light into the diffuser unit is reducible. It would be conceivable that the attachment comprises an attachment receptacle for a form-fit holding of the diffuser element.

It is moreover proposed that the passive illumination device comprises a fastening unit for an, in particular removable, fixation of the diffuser unit to the image receiver. In particular, the fastening unit is implemented at least partly integrally with the diffuser unit. By the fastening unit being implemented "at least partly integrally" with the diffuser unit is in particular to be understood that the diffuser unit and the fastening unit have at least one common component. Advantageously the common component is the attachment. This in particular allows simplifying a fixation and/or release of the diffuser unit to/from the image receiver. Advantageously the fastening unit may be used as an adapter and may enable a fixation of the diffuser unit to a plurality of different image receivers.

Furthermore, a system, in particular a code reading and/or code verification system, is proposed, with the passive illumination device and with the image receiver, in particular the code reading and/or code verification device. This in particular allows a simplification of a construction.

It would be conceivable that the light source unit comprises a plurality of light sources with respectively different orientations. For simplifying the image receiver, it is proposed that all light sources of the light source unit are oriented parallel to one another. Preferably all light sources provide light in solid-angle regions which are arranged neighboring one another, which are congruent with one another and have identical orientations. In particular, the light sources of the light source unit are arranged in a planar oval, preferably in a planar circle and/or in a planar square. Advantageously, it is possible to do without differently oriented light sources, which would for example be directed to the optical element.

DRAWINGS

Further advantages will become apparent from the following description of the drawings. In the drawings three exemplary embodiments of the invention are illustrated. The drawings, the description and the claims contain a plurality of features in combination. Someone skilled in the art will purposefully also consider the features separately and will find further expedient combinations.

Figure 2:
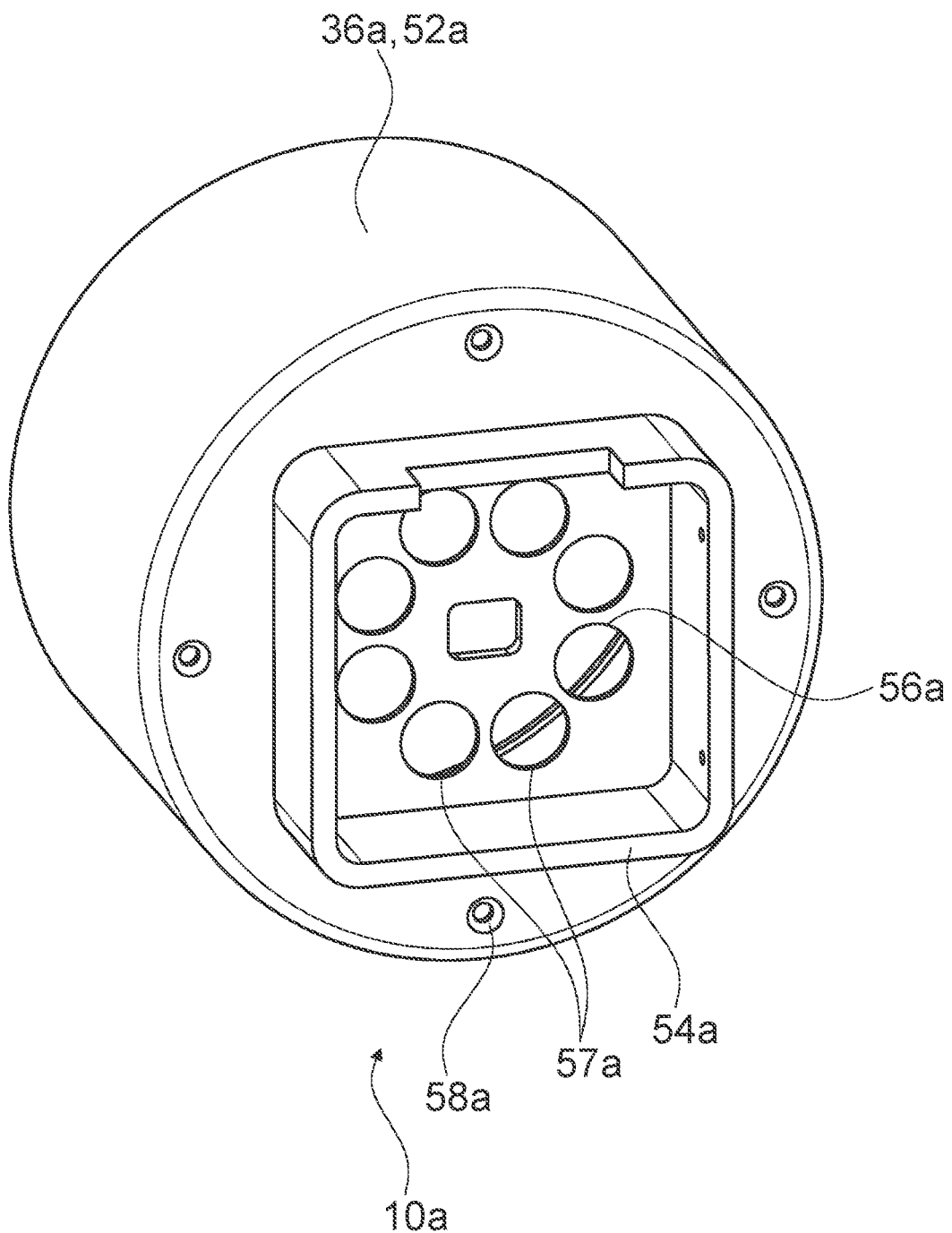
Figure 3:
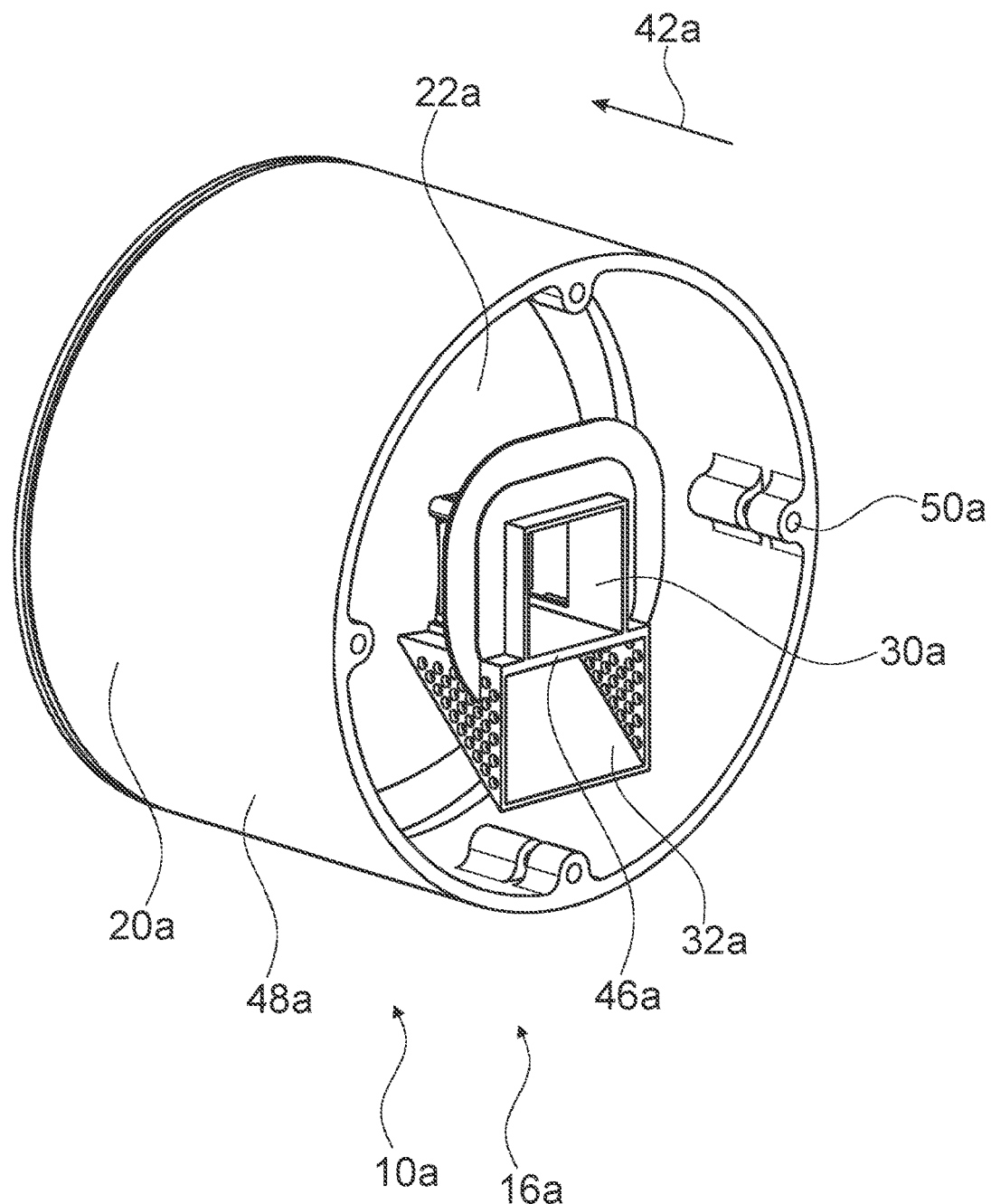
Figure 4:
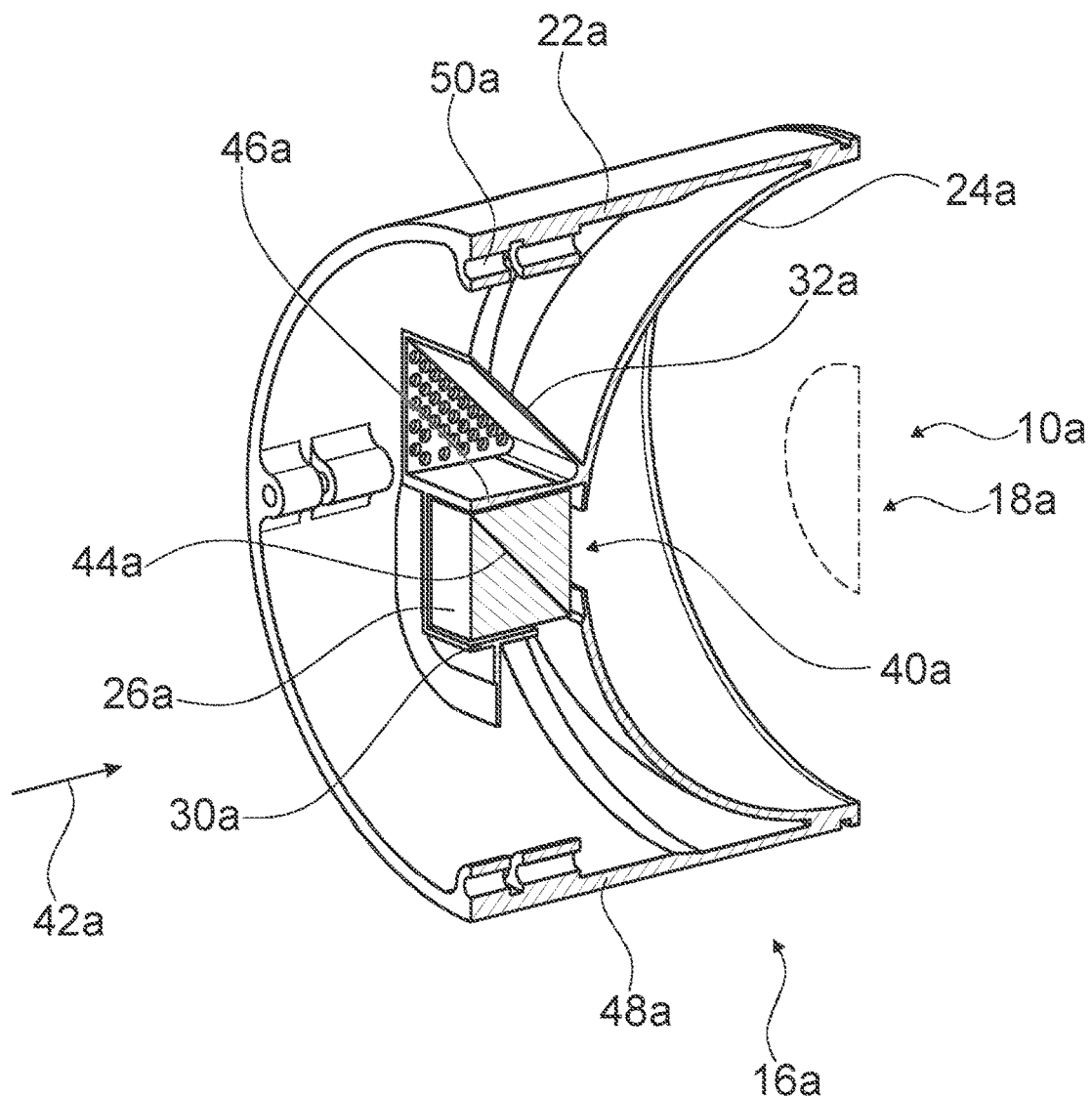
Figure 5:
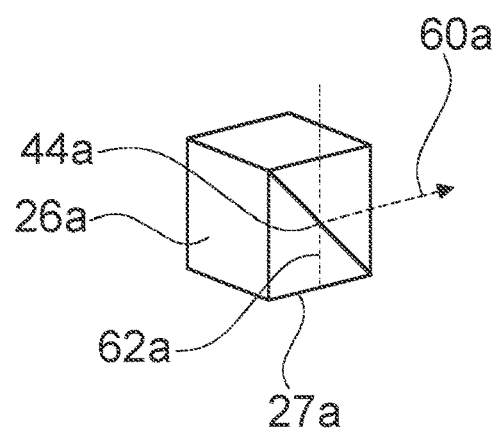
Figure 6:
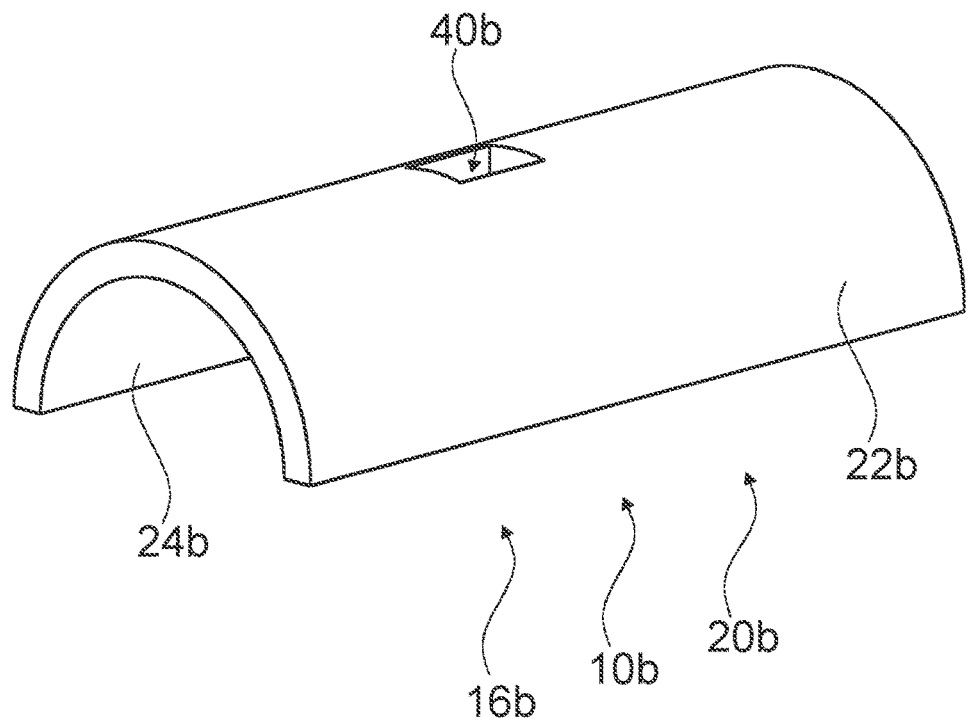
Figure 7:
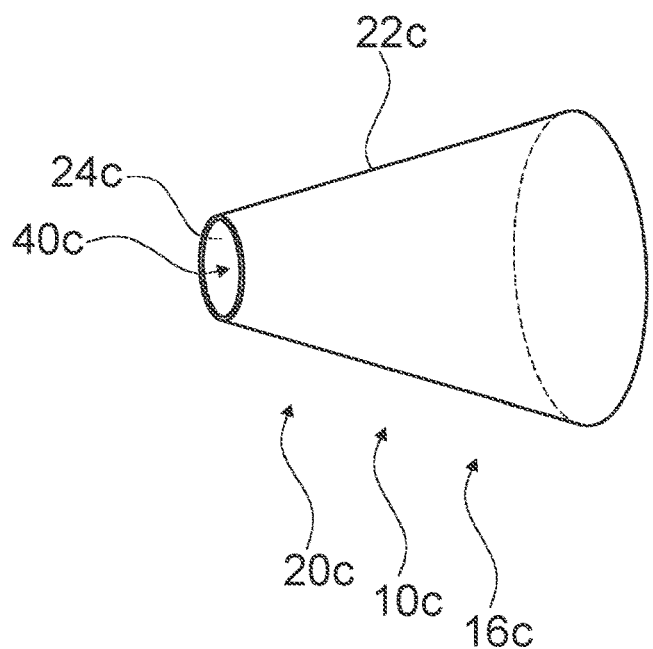

It is shown in:

FIG. 1 a schematic illustration of a system with a passive illumination device and with an image receiver, in an exploded view, FIG. 2 a schematic illustration of a fastening unit of the passive illumination device in an oblique view from above, FIG. 3 a schematic illustration of a diffuser element of the passive illumination device in an oblique view from above, FIG. 4 a schematic illustration of the diffuser element in a sectional view, FIG. 5 a schematic illustration of an optical element of the passive illumination device in a view from above, FIG. 6 a schematic illustration of a diffusion shell of an alternative passive illumination device in an oblique view from above, and FIG. 7 a schematic illustration of a diffusion shell of a further alternative passive illumination device in a sidewise oblique side view.

DESCRIPTION OF THE EXEMPLARY EMBODIMENTS

Of objects present more than once, in each case only one is given a reference numeral in the figures. In the description of the exemplary embodiments, the terms "above" and "below" refer to the customary installation position, in which an object that is to be scanned is arranged below and an image receiver is arranged above.

FIG. 1 shows a system 38a, in the present case a code reading and/or code verification system. The system 38a comprises an image receiver 14a. The image receiver 14a is embodied as a code reading device and/or code verification device known from the prior art. The image receiver 14a comprises a light source unit 12a. The light source unit 12a comprises light sources 28a, 29a, which are arranged in the shape of a planar circle. The light source unit 12a comprises six light sources 28a and two light sources 29a. Alternatively, a different number of light sources 28a, 29a and a different arrangement of the light sources 28a, 29a would also be conceivable. All of the light sources 28a, 29a are oriented parallel to one another. The light sources 28a, 29a are implemented identically to one another, such that only one of the light sources 28a, 29a will be described below.

The system 38a comprises a passive illumination device 10a, parts of which are illustrated in detail in FIGS. 2 to 5.

The passive illumination device 10a is configured to be used with the light source unit 12a. The passive illumination device 10a comprises a diffuser unit 16a. The diffuser unit 16a is configured to convert light provided by the light source unit 12a into diffuse illumination light for an illumination of an illumination region 18a (cf. FIGS. 1 and 4). The diffuser unit 16a comprises a diffuser element 20a, which is shown in detail in FIG. 4. The diffuser element 20a is implemented completely of a translucent material. The diffuser element 20a is made of polyamide. Alternatively, the diffuser element 20a could be made of other materials deemed expedient by someone skilled in the art, for example other synthetic materials, in particular ABS, PP, PU and/or PC, and/or quartz glass. The diffuser element 20a is embodied in a one-part implementation. The diffuser element 20a has been produced via a 3D printing method.

The diffuser element 20a comprises a diffusion shell 22a. The diffusion shell 22a servers for a scattering of the light provided by the light source unit 12a for the purpose of providing at least a light fraction of the diffuse illumination light. The diffusion shell 22a has an inner surface 24a. The inner surface 24a is formed as a partial surface of an imaginary sphere. The diffusion shell 22a comprises a pass-through 40a. The pass-through 40a is configured to allow a passage of light reflected by the illumination region 18a to a detector unit (not shown) of the image receiver 14a. The pass-through 40a is arranged on a region of the diffusion shell 22a that is maximally spaced apart from the illumination region 18a. The pass-through 40a is implemented as a recess of the diffusion shell 22a.

The diffuser element 20a comprises an envelope 48a. The envelope 48a has a cylinder-envelope-shaped basic shape. In a view starting from the illumination region 18a, the envelope 48a encompasses the diffusion shell 22a completely. The envelope 48a comprises screw threads 50a. The screw threads 50a serve for an indirect fixation of the diffuser element 20a to the image receiver 14a. Alternatively, the envelope 48a could comprise lay-in regions for nuts and/or snap elements and/or plug elements.

The diffuser unit 16a comprises an optical element 26a, which is shown in detail in FIG. 5. The optical element 26a is configured to deflect diffuse illumination light, generated from light provided by the two light sources 29a of the light source unit 12a, toward the illumination region 18a. Alternatively the optical element 26a could deflect the light provided by the two and/or from any of the six light sources 28a of the light source unit 12a toward the illumination region 18a. The optical element 26a deflects the diffuse illumination light via one-time reflection. The optical element 26a is configured to allow a passage of light reflected by the illumination region 18a, which has in particular passed the pass-through 40a. The optical element 26a comprises a semi-permeable mirror 44a. The semi-permeable mirror 44a deflects a light fraction 60a of the diffuse illumination light toward the illumination region 18a. The semi-permeable mirror 44a lets a further light fraction 62a of the diffuse illumination light pass. The optical element 26a is embodied as a beamsplitter cube. The semi-permeable mirror 44a forms a diagonal surface of the optical element 26a.

The optical element 26a comprises an absorption element 27a. The absorption element 27a is configured to absorb the further light fraction 62a. The absorption element 27a is implemented as a coating of one side of the optical element 26a.

The absorption element 27a has a refractive index that is identical to a refractive index of a remaining optical element.

The diffuser element 20a comprises a receptacle 30a. The receptacle 30a serves for a form-fit holding of the optical element 26a. The receptacle 30a is embodied as a frame. The receptacle 30a has an insertion opening that fits with the optical element 26a. The insertion opening defines an insertion direction 42a, along which the optical element 26a is insertable in the receptacle 30a. The receptacle 30a is implemented integrally with the diffusion shell 22a. Alternatively the receptacle 30a could be fastened to the diffusion shell 22a via at least one snap connection and/or plug connection and/or adhesive connection. In a view starting from the illumination region 18a, the receptacle 30a is arranged behind the pass-through 40a.

The diffuser unit 16a comprises a subregion 32a (cf. FIGS. 3 and 4). The subregion 32a is configured for feeding the light provided by the two light sources 29a into the optical element 26a. Alternatively or additionally, the subregion 32a may be configured to feed the light provided by any of the six light sources 28a into the optical element 26a; therefore just one of the light sources 28a, 29a, which may be any of the light sources 28a, 29a, will be mentioned in the following in relation to features of the subregion 32a. The subregion 32a is implemented as part of the diffuser element 20a. The subregion 32a is embodied as a planar element of the diffuser element 20a. The subregion 32a is arranged along the insertion direction 42a after the light source 28a, 29a. The subregion 32a contributes such that the light provided by the light source 28a, 29a enters the optical element 26a at least partially. The subregion 32a is additionally configured for feeding the light provided by the light source 28a, 29a at least partially into the diffusion shell 22a. In a view starting from the illumination region 18a, the subregion 32a is arranged behind the diffusion shell 22a. The subregion 32a is implemented integrally with the receptacle 30a. Alternatively, the subregion 32a could be fastened to the receptacle 30a via a snap connection and/or plug connection and/or adhesive connection. The diffuser element 20a comprises a partition wall 46a. The partition wall 46a is arranged between the subregion 32a and the receptacle 30a. The partition wall 46a is configured for converting the light provided by two of the light sources 28a and deflected by the subregion 32a into diffuse light. Alternatively the diffuser element 20a could be free of partition walls.

The diffuser unit 16a has an outer wall 34a. The outer wall 34a encompasses the diffusion shell 22a completely. The outer wall 34a comprises the envelope 48a. The outer wall 34a comprises an attachment 52a, which is shown in detail in FIG. 2. The attachment 52a is entirely implemented of an opaque material. The attachment 52a comprises an attachment receptacle 54a. The attachment receptacle 54a is configured for a form-fit holding of the image receiver 14a. The attachment receptacle 54a is implemented as an elevation of the attachment 52a. The attachment receptacle 54a has holes 56a, 57a. The holes 56a, 57a are configured to allow a passage of light provided by the light source unit 12a. The holes 56a, 57a realize a light pass-through region of the illumination device 10a. The attachment 52a has six holes 56a, which are arranged correspondingly to the six light sources 28a. The attachment 52a has two holes 57a, which are arranged correspondingly to the two light sources 29a. The two holes 57a are configured to allow a passage of light provided by the two light sources 29a to the subregion 32a. Alternatively, the attachment 52a could have any other number of holes 56a, 57a that corresponds to a number of light sources 28a, 29a of the light source unit 12a.

Alternatively or additionally, the attachment 52a may comprise a filter element (not shown). The filter element serves for a homogenization and/or scattering of a light intensity of the diffuse illumination light. The filter element could be arranged in front of the holes 56a, 57a and could, for example, reduce a light intensity of light entering through the holes 56a.

The attachment 52a comprises further screw threads 58a. Alternatively, the attachment 52a could comprise further snap elements and/or further plug elements. The further screw threads 58a correspond to the screw threads 50a for a fixation of the diffuser element 20a to the attachment 52a. In a mounted state (not shown) of the illumination device 10a, the screw threads 50a and the further screw threads 58a are respectively arranged consecutively along the insertion direction 42a. In the mounted state, the screw threads 50a and the further screw threads 58a respectively receive shared screws. The screws fix the attachment 52a and the diffuser element 20a relative to each other. In the mounted state, the illumination device 10a can be plugged as a whole onto the image receiver 14a.

The passive illumination device 10a comprises a fastening unit 36a. The fastening unit 36a is configured for a removable fixation of the diffuser unit 16a to the image receiver 14a. The fastening unit 36a is embodied as part of the diffuser unit 16a. The fastening unit 36a comprises the attachment 52a.

In FIGS. 6 and 7 two further exemplary embodiments of the invention are shown. The following descriptions are essentially limited to the differences between the exemplary embodiments, wherein regarding components, features and functions that remain the same, the description of the exemplary embodiment of FIGS. 1 to 5 may be referred to. In order to distinguish between the exemplary embodiments, the letter a in the reference numerals of the exemplary embodiment of FIGS. 1 to 5 has been replaced by the letters b and c in the reference numerals of the exemplary embodiments of FIGS. 6 and 7. In regard to components having the same denomination, in particular in regard to components having the same reference numerals, the drawings and/or the description of the exemplary embodiment of FIGS. 1 to 4 may principally be referred to.

FIG. 6 shows a diffusion shell 22b of an alternative passive illumination device 10b in a simplified isolated illustration. The diffusion shell 22b comprises an inner surface 24b, which is implemented as a partial surface of an imaginary cylinder. The inner surface 24b is implemented as a half-envelope of the imaginary cylinder.

FIG. 7 shows a diffusion shell 22c of a further alternative passive illumination device 10c in a simplified isolated illustration. The diffusion shell 22c comprises an inner surface 24c, which is embodied as a partial surface of an imaginary conus, namely as an envelope surface of an imaginary truncated conus.

| Reference numerals | | |
|---|---|---|
| 10 | Beleuchtungsvorrichtung | illumination device |
| 12 | Lichtquelleneinheit | light source unit |
| 14 | Bildaufnehmer | image receiver |
| 16 | Diffusoreinheit | diffuser unit |
| 18 | Beleuchtungsbereich | illumination region |
| 20 | Diffusorelement | diffuser element |
| 22 | Streuschale | diffusion shell |
| 24 | Innenfläche | inner surface |
| 26 | optisches Element | optical element |
| 27 | Absorptionselement | absorption element |
| 28 | Lichtquelle | light source |
| 29 | Lichtquelle | light source |
| 30 | Aufnahme | receptacle |
| 32 | Teilbereich | subregion |
| 34 | Außenwandung | outer wall |

-continued

| | Reference numerals | |
|---|---|---|
| 36 | Befestigungseinheit | fastening unit |
| 38 | System | system |
| 40 | Durchlass | pass-through |
| 42 | Einführrichtung | insertion direction |
| 44 | halbdurchlässiger Spiegel | semi-permeable mirror |
| 46 | Zwischenwand | partition wall |
| 48 | Mantel | envelope |
| 50 | Schraubgewinde | screw thread |
| 52 | Aufsatz | attachment |
| 54 | Aufsatzaufnahme | attachment receptacle |
| 56 | Loch | hole |
| 57 | Loch | hole |
| 58 | weiteres Schraubgewinde | further screw thread |
| 60 | Lichtanteil | light fraction |
| 62 | weiterer Lichtanteil | further light fraction |

The invention claimed is:

1. A passive illumination device of a code reading device and/or code verification device, the passive illumination device being for use with at least one light source unit of an image receiver and comprising
at least one diffuser unit which is configured for converting light provided by the light source unit into at least substantially diffuse illumination light for an illumination of at least one illumination region, the at least one diffuser unit comprising at least one diffuser element having at least one diffusion shell for a scattering of the light,
wherein when viewed from the illumination region, the at least one diffusion shell has a concave shaping,
wherein the diffuser unit comprises at least one optical element, which is configured to deflect light provided by at least one light source of the light source unit toward the illumination region,
wherein the optical element is embodied as a beamsplitter cube,
wherein the diffuser element comprises at least one receptacle for a form-fit holding of the optical element, and
wherein the diffuser unit comprises at least one subregion that is configured to feed light provided by the light source into the optical element.

2. The passive illumination device according to claim 1, wherein the diffusion shell comprises at least one inner surface, which is implemented as a partial surface of an imaginary ovoid.

3. The passive illumination device according to claim 1, wherein the diffusion shell comprises at least one inner surface, which is implemented as a partial surface of an imaginary cylinder.

4. The passive illumination device according to claim 1, wherein the diffusion shell comprises at least one inner surface, which is implemented as a partial surface of an imaginary conus.

5. The passive illumination device according to claim 1, wherein the optical element is configured to let light reflected by the illumination region pass at least partially.

6. The passive illumination device according to claim 1, wherein the optical element comprises at least one semi-permeable mirror.

7. The passive illumination device according to claim 1, wherein the subregion is additionally configured to feed light provided by the light source into the diffusion shell.

8. The passive illumination device according to claim 1, wherein the diffuser element is implemented in one piece.

9. The passive illumination device according to claim 1, wherein the diffuser unit comprises an outer wall encompassing the diffusion shell completely.

10. The passive illumination device according to claim 1, comprising a fastening unit for an, in particular removable, fixation of the diffuser unit to the image receiver.

11. A system, in particular a code reading system and/or code verification system,
with at least one passive illumination device according to claim 1 and
with the image receiver, in particular the code reading device and/or code verification device.

12. The system according to claim 11, wherein all light sources of the light source unit are oriented parallel to one another.

13. The passive illumination device according to claim 1, wherein the diffusion shell is a portion of the diffuser element which is implemented completely of a translucent material.

14. The passive illumination device according to claim 1, wherein the diffusion shell defines a solid-angle zone from which the diffuse illumination light hits the illumination region.

15. The passive illumination device according to claim 14, wherein the solid-angle region is at least substantially 2π.

16. The passive illumination device according to claim 10, herein the fastening unit is implemented at least partly integrally with the diffuser unit and comprises an attachment.

17. The passive illumination device according to claim 16, wherein the attachment has holes which are configured to allow a passage of light provided by the light source unit.

* * * * *